3,397,225
PREPARATION OF ESTERS OF
UNSATURATED ACIDS
Donald M. Fenton, Anaheim, Calif., assignor to Union
Oil Company of California, Los Angeles, Calif., a corporation of California
No Drawing. Filed June 15, 1964, Ser. No. 375,342
9 Claims. (Cl. 260—486)

ABSTRACT OF THE DISCLOSURE

The invention comprises the oxidative carbonylation of a hydrocarbon olefin by contacting the olefin and carbon monoxide with an alcoholic reaction medium containing a platinum group metal and a soluble salt of a multivalent metal having an oxidation potential more positive than said platinum metal. The reaction proceeds to form the ester of an alpha,beta-unsaturated carboxylic acid having one more carbon than said olefin. A specific illustration is the formation of methyl acrylate by introducing ethylene and carbon monoxide into contact with a methanol solution of palladium chloride and cupric chloride at a pressure of about 1000 p.s.i.g. and a temperature of about 100° C.

DESCRIPTION OF THE INVENTION

This invention relates to a method for the preparation of esters of unsaturated acids from olefins and in a specific embodiment prescribes a method for the direct preparation of acrylates from ethylene.

Commercially, most acrylate esters are produced from acetylene by the oxo process employing a carbonyl catalyst, although some acrylates are also prepared from beta-propiolactone and from ethylene cyanohydrin. Almost the entire production of methacrylates is derived from acetone and hydrogen cyanide by a fairly complex series of reactions.

While acrylate esters are commercially prepared in this fashion, these preparations employ relatively expensive raw materials and complex process steps.

It is an object of this invention to provide a direct method of preparation of esters of unsaturated acids.

It is also an object of this invention to provide a method for the preparation of such esters from olefins.

It is a specific object of this invention to provide a preparation of acrylate esters from ethylene.

I have now found that esters of unsaturated acids, particularly alkyl acrylates, can be readily obtained from hydrocarbon olefins by contacting the olefin and carbon monoxide with a substantially anhydrous alcoholic solution of a soluble salt of a platinum group metal in a high oxidation state. The reaction results in a stoichiometric reduction of the platinum metal to a lower oxidation state. To increase the conversion, I prefer to also employ a redox agent that can return the platinum metal to its higher oxidation state for further reaction. The reaction is illustrated by the following:

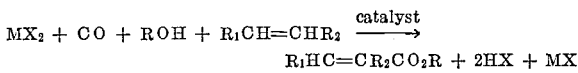

$$MX_2 + CO + ROH + R_1CH=CHR_2 \xrightarrow{catalyst} R_1HC=CR_2CO_2R + 2HX + MX$$

wherein:
The catalyst comprises a platinum group metal in a high oxidation state;

R can be alkyl, aryl, alkaryl or aralkyl;
$R_1$, $R_2$ and $R_3$ can be hydrogen, alkyl, aryl, alkaryl, aralkyl;
X is a suitable anion; and
M represents a multivalent metal cation which functions as a redox agent.

In its simplest embodiment, the hydrocarbon olefin is ethylene, the alcohol is methanol, the anion is chloride, and the resultant acrylate is methyl acrylate. In other embodiments, the hydrocarbon olefin can be propylene and the resultant product will comprise crotonates.

The reaction can be conducted under relatively mild conditions, e.g., 25° to about 300° C. and pressures from about atmospheric to 2500 p.s.i.g. While vapor phase reactions with a supported catalyst on an inert carrier such as alumina, silica, titania, zirconia, aluminum silicates, etc., can be used, preferably the pressure is sufficient to maintain a liquid phase in the reaction zone. The reaction, which is performed under anhydrous conditions, results in the stoichiometric reduction of redox agent to its lower oxidation state as shown in the aforementioned reaction.

The reduced form of the redox agent, e.g., cuprous chloride can be regenerated in a plurality of methods so as to provide a continuous preparation of the acrylate product. Oxygen, ozone, or other oxygen-containing oxidizing agents can be employed in a separate regeneration of the redox agent. In this practice, the reaction is conducted until substantially all the redox agent has been reduced. The acrylate product is separated from the reaction zone and the reduced solution is thereafter contacted with an oxygen-containing gas to return the redox agent to its higher oxidation state. Prior to the reuse of the catalyst solution, however, the water formed in the oxygen reoxidation of the redox agent is removed from the solution. Any conventional technique for eliminating water or for dehydrating an alcoholic solution can be employed for this step.

In alternative regeneration techniques, the redox agent can be contacted with an elemental halogen, e.g., chlorine, bromine, etc., to oxidize it to its higher oxidation state, a reaction that does not produce water. Accordingly, the contacting of the reaction medium with the halogen can be performed simultaneously with the contacting by the hydrocarbon olefin or, if desired, performed in a separate regeneration step.

In a second alternative processing technique, the redox agent can be reoxidized to its higher oxidation state by electrolysis, e.g., by employing the redox agent in a solution as an anolyte in an electrolytic cell and removing electrons therefrom by the application of an external voltage to the cell, thus maintaining it in its higher oxidation state. This technique can be performed simultaneously with the contacting of the solution by the hydrocarbon olefin or performed in a separate regeneration step.

Referring now to the alcoholic reactant which, preferably, is also the reaction medium, any alkyl, cycloalkyl, aryl, alkaryl or aralkyl monohydroxy alcohol having from about 1 to 20 carbons can be employed. Preferably, aliphatic alcohols having about 1 to 6 carbons are used such as methanol, ethanol, propanol, isopropanol, butanol, isobutanol, pentanol, isopentanol, hexanol, heptanol, octanol, nonyl, decanol, etc. Cyclic alcohols such as cyclohexanol, cyclopentanol, 2-ethyl cyclohexanol, etc., can be employed.

Phenol, naphthol, ortho, meta or para-cresol, cumenol, xylenol, etc., can also be employed if desired.

As previously mentioned, the alcohol is preferably used in excess and thus comprises the reaction medium. If desired, however, other organic solvents which are liquid at the reaction conditions and inert to the reactants and products can also be employed. Such solvents include for example: various ethers such as methyl ethyl ether, diethyl ether, diisopropyl ether, dichloroethyl ether, ethylene glycol diisoamyl ether, ethyl benzyl ether, diethylene glycol diethyl ether, triethylene glycol diethyl ether, tetraethylene glycol dimethyl ether, etc.

Various esters can also be employed as the solvents such as methyl formate, ethyl formate, methyl acetate, ethyl acetate, n-propyl formate, isopropyl acetate, ethyl propionate, n-butyl formate, sec-butyl acetate, isobutyl acetate, ethyl n-butyrate, n-butyl acetate, isoamyl acetate, n-amyl acetate, glycol diformate, furfural acetate, isoamyl n-butyrate, ethyl acetylacetate, diethyl oxalate, glycol diacetate, isoamyl isovalerate, methyl benzoate, ethyl benzoate, methyl salicylate, n-propyl benzoate, n-dibutyl oxalate, etc.

Saturated hydrocarbons can also be used such as pentane, hexane, heptane, octane, decane, dodecane, mineral oils, etc.

The acid portion of the ester produced in accordance with my invention is derived from the olefin and contains one more carbon than the olefin. Accordingly, the identity of the product desired dictates the choice of hydrocarbon olefin; acrylates requiring the use of ethylene. Esters of higher unsaturated acids, however, can be obtained from other olefins and the following are typical of olefins which can be reacted: ethylene, propylene, butene-1, butene-2, isobutene, pentene-1, pentene-2, 2-methylbutene-1, 2-methylbutene-2, cyclopentene, hexene-1, hexene-2, hexene-3, cyclohexene, 2-ethylbutene-1, 2-methylpentene-1, heptene-3, 2-ethylhexene-3, cycloheptene, 1-methylcyclohexene, 1-octene, isooctene, cyclooctene, 1-ethylcyclohexene, 1-nonene, isononene, 1-decene, 1-butylcyclohexene, 1,3-diethylcyclohexene, isodecene, indene, styrene, alpha-methylstyrene, allylbenzene, etc. In general, any hydrocarbon olefin having from about 2 to about 20 carbons, preferably from about 2 to about 6 carbons, can be employed in the reaction provided that at least one of the unsaturated carbons is bonded to a hydrogen to form an available oxidation site.

The reaction is performed under anhydrous conditions at temperatures from about 25° to 300° C., preferably from about 100° to about 225° C. and pressures sufficient to maintain liquid phase conditions. Preferably, elevated pressures to increase the solubility of the gaseous reactants in the reaction medium are employed, e.g., pressures from about 100 to about 2500 p.s.i.g.; most preferably from about 500 to 1000 p.s.i.g. are employed. As previously mentioned, the reaction is performed by introducing the hydrocarbon olefin and carbon monoxide into contact with the alcoholic reaction medium which contains dissolved quantities of a soluble cupric salt and a platinum group metal.

The platinum group metal can be of the platinum sub-group, i.e., platinum, rhodium or ruthenium or of the palladium sub-group, i.e., palladium, uranium or osmium. Palladium is preferred because of its demonstrated greater activity. In general, the platinum group metal can be employed in amounts between about 0.001 and 5.0 weight percent of the liquid reaction medium; preferably between about 0.04 and about 0.5 weight percent. The platinum group metal can be introduced into the reaction medium as a finely divided metal, as a soluble salt or as a chelate. Examples of suitable salts are the halides, sulfates, nitrates, and salts of the lower ($C_1$–$C_5$) carboxylates such as palladium chloride, rhodium acetate, ruthenium bromide, osmium oxide, iridium nitrate, palladium sulfate, platinum acetate, etc. Examples of suitable chelates are palladium acetylacetonate and complexes of the aforementioned platinum group metal ions with such conventional chelating agents as citric acid, ethylene diamine tetraacetic acid, etc.

As previously mentioned, various redox compounds can optionally be used in the reaction medium to accelerate the rate of reaction. In general, any multivalent metal salt having an oxidation potential higher, i.e., more positive than the platinum metal in the solution, can be used. Typical of such are the soluble salts of the multivalent metal ions such as the $C_1$ to $C_5$ fatty acid carboxylates, e.g., propionates, valerates, acetates, etc.; nitrates; sulfates; halides, e.g., bromides, chlorides, etc.; of copper, iron manganese, cobalt, mercury, nickel, cerium, uranium, bismuth, tantalum, chromium, molybdenum, or vanadium. Of these, cupric and ferric salts are preferred and cupric salts are most preferred. Examples of the preferred cupric salts are cupric chloride, cupric bromide, cupric iodide, cupric fluoride, cupric nitrate, cupric sulfate, cupric acetate, cupric valerate, etc. The cupric salt can be employed in any desired amount, the higher concentrations being capable of effecting a higher conversion before requiring regeneration since, as the reaction illustrates, a stoichiometric quantity of the cupric salt is reduced to a cuprous salt in the oxidation. In general, the alcoholic reaction medium can contain from about 1 weight percent of a cupric salt up to and exceeding its saturation of the salt. In this fashion the reaction medium can comprise a supersaturated slurry of the cupric salt. During the reaction, the soluble cupric salt is reduced to the cuprous and precipitates with fresh cupric salt dissolving until the entire inventory of the cupric salt has been reduced. In this fashion, slurries containing up to 80 weight percent of the cupric salt can be employed. This technique is desirable when employing separate regeneration of the cuprous salt so as to extend run lengths prior to the necessary regeneration. Preferably, the concentration of the cupric salt is from about 5 to about 20 weight percent and, when the reaction is performed simultaneously with a non-oxygen regeneration of the cuprous salt, the solubility of the cupric salt is not exceeded.

The reaction proceeds by a mechanism wherein the platinum metal is reduced to a lower oxidation state and then is oxidized by the redox agent. To facilitate this oxidation and thereby increase the rate of reaction, I prefer to employ a reaction medium that contains between about 0.05 and 5.0 weight percent free or coordinately bonded or covalently bonded halogen in the reaction zone. Preferably, concentrations between about 0.1 and 3.0 weight percent are employed. This amount of halogen is preferably also in excess of the stoichiometric quantity necessary to form the halide of the most oxidized state of platinum group metal, e.g., in excess of two atomic weights of halogen per atomic weight of palladium present. In this manner, a rapid oxidation can be achieved. The halogen can be added as elemental chlorine or bromine; however, it is preferred to employ less volatile halogen compounds such as hydrogen, alkali metal or ammonium halide, e.g., hydrogen chloride, hydrogen bromide, cesium chloride, potassium bromide, sodium bromate, lithium chlorate; ammonium bromide, ammonium chloride, etc. Also, any of the aforementioned platinum group metals can be added to supply a portion of the bromide or chloride and, when the hereafter mentioned multivalent metal redox salts are employed, these too can be added as the chloride or bromide. Various organic compounds which liberate chlorine, bromine, hydrogen chloride or bromide under the reaction conditions can also be used, such as aliphatic chlorides or bromides, e.g., ethyl bromide, propyl chloride, butyl chloride, benzyl bromide, phosgene, etc.

The regeneration can be performed during the reaction or in a separate regeneration step. Because the reaction must be performed under anhydrous conditions, oxygen oxidation of the cuprous to cupric salt can not be conducted simultaneously with the reaction unless steps are taken to eliminate the water and prevent it from participating in the reaction. Other methods of oxidation of the cuprous to cupric salt, however, can be simultaneously performed with the reaction. To illustrate, a halogen can be used as the oxidizing agent such as chlorine, bromine, or fluorine, by simultaneously introducing the halogen into the reaction zone. Under the aforementioned reaction conditions the cuprous salt is oxidized by the halogen to the cupric halide.

If desired, a suitable dehydrating agent can be used to maintain the reaction under anhydrous conditions. With such dehydrating agnets, it is possible to employ simultaneous oxygen oxidation by introducing oxygen together with the olefin into contact with the reaction medium. Examples of suitable organic dehydrating agents which, for ease of handling, have from 2 to about 25 carbons are: alkyl and aryl isocyanates such as methyl isocyanate, benzene isocyanate, toluidene diisocyanate, amyl isocyanate, isooctyl isocyanate, etc.; N,N'-alkyl and aryl substituted carbodiimides such as N,N'-dimethyl carbodiimide, N,N'-diethyl carbodiimide, N,N'-diisopropyl carbodiimide, N,N'-dibutyl carbodiimide, N-amyl, N'-methyl carbodiimide, N,N'-dicyclohexyl carbodiimide, N, N'-diphenyl carbodiimide, N,N'-dibenzyl carbodiimide, etc.; alkyl acetals and ketals such as 1,1-diethoxyethane, 1,1-dibutoxyethane, 2,2-dimethoxypropane, 2,2-diethoxybutane, 3,3-diisopropoxypropane, 3,3-dipentoxyhexane, 1,1-dimethoxycyclohexane, etc.; alkyl orthoesters such as ethyl orthoformate, methyl orthoformate, butyl orthoacetate, ethyl orthoacetate, etc.

The reduced cuprous salts can readily be reoxidzied to cupric by conducting the reaction in the anode chamber of the electrolytic cell and applying a voltage between the electrodes so as to remove electrons from the anode chamber, i.e., from the cuprous ions and thereby oxidize these ions to cupric. In this embodiment, the catholyte preferably comprises an aqueous hydrogen halide solution and hydrogen is liberated at this cathode with the halide ions passing through a salt bridge or other permeable diaphragm between the cells.

As previously mentioned, the oxidation of the reduced cuprous salt solution can be effected in a step separate from the reaction step where the olefin and carbon monoxide are contacted with the solution. In this operation, oxygen or an oxygen-containing oxidizing compound can be employed to regenerate the cuprous ion. A suitable regeneration comprises introducing a stream of oxygen or mixture of oxygen and an inert gas, e.g., nitrogen, air, etc., into contact with the catalyst solution which has become reduced from previous contacting with the olefin and carbon monoxide. Temperatures from about 20° to about 250° C. are sufficient for this operation and the pressures employed are sufficient to maintain the alcoholic reaction medium in the phase, e.g., atmospheric to about 2000 p.s.i.g. Because the oxygen oxidation of the solution forms water, steps must be taken to dehydrate the solution before again contacting it with the olefin and carbon monoxide. Preferably, the water is vaporized from the reaction medium and this vaporization can be facilitated by stripping the reaction medium within an inert gas such as combustion gases, nitrogen, etc., or by continuing to introduce oxygen or air into the solution after oxidation has been effected to strip the water from the solution. Preferably, to facilitate removal of the water, the pressure can be subatmospheric, atmospheric or slightly elevated above atmospheric, e.g., from about 20 millimeters mercury to about 10 atmospheres. All or a portion of the water can also be removed by the addition of sufficient quantities of any of the aforementioned dehydrating agents.

When the alcoholic reactant is more volatile than water, it is apparent that the volatilization of water from this solution of necessity removes such alcoholic reactant. Accordingly, it is preferred when employing such alcoholic reactants in the oxygen regeneration scheme to employ a second reaction medium which is less volatile than water. This medium will retain the catalyst salts in solution. The alcoholic reactant vaporized from the medium in the water removal step is returned to the reaction medium during the reaction. Any of the aforementioned solvents having a lesser volatility than water can be employed for this purpose or, if desired, any of the aforementioned alcoholic reactants higher boiling than water can be employed.

As previously mentioned, the reaction forms an ester of an unsaturated acid, cuprous chloride and hydrogen chloride. When operating in a continuous fashion, a portion of the liquid reactants can be continuously removed from the reaction zone and the ester of the unsaturated acid purified therefrom. A suitable purification step comprises, e.g., azeotropic distillation of the liquid to remove the ester and alcoholic reactant if they form or azeotrope from the balance of the alcohol which is returned to the reaction zone. When the particular alcohol and ester do not form an azeotrope, any other known azeotroping agent can be added to obtain the ester in the volatile fraction from the crude product. Relative rates of the carbon monoxide based on the olefin can be from 1:10 to 10:1 molecular units per molecular unit of olefin, preferably rates from about 1:1 to about 5:1 and most preferably from 1:1 to 2:1 molecular ratios are employed.

To permit a continuous reaction when using a separate regeneration step, a portion of the catalyst salts can also be withdrawn, preferably in admixture with the liquid product and, after recovery of the ester product, the catalyst is regenerated by any of the aforementioned separate regeneration schemes. The regenerated solution can then be recycled to the oxidation zone.

Various mechanical designs of the reaction zone can be employed. Two or more vessels can be employed while alternating or switching of the reaction and regeneration between the vessels so that a continuous production of the ester can be achieved. When using the non-oxygen oxidizing agent or when using the electrolytic oxidation, the reaction and regeneration can be performed simultaneously in a single vessel. Such vessel can be equipped with a cooling means and stirrer to insure adequate contacting of the gas and liquid within the reaction zone.

Various mechanical designs of electrolytic cells can be used in the oxidation. In general, such cells comprise two chambers which are separated by a porous diaphragm to prevent a mixture of the electrolytes. These chambers are preferably equipped with mechanical stirrers and heating or cooling elements to maintain the desired reaction temperature. The anode chamber can be composed of or lined with stainless steel or any other similar corrosion resistant material. The anode can be carbon or any inert metal, i.e., any metal having an oxidation potential more negative than the oxidizing potential of the cupric ion in the anolyte. Generally, carbon electrodes are preferred.

The cathode chamber can be constructed of or lined with stainless steel or other similar corrosion resistant metals; however, mild or carbon steel can also be used when the walls of the cathode chamber are employed as the cathode by applying the negative potential of the cell thereto. In this method, current densities greater than about 0.4 ampere per square centimeter can be used in this chamber and at this current density, substantially no corrosion of the mild steel will occur.

The cell chambers are separated by a membrane which prevents mixing of the anolyte and catholyte, yet which is sufficiently porous to permit passage of current conducting anions, particularly halide anions as hereafter described. In general, various ceramic materials such as fritted glass or sintered glass powders can be used. Other suitable membranes can be porous or foamed plastics such as Teflon, asbestos, etc.

The mechanical design of the cell can be widely varied. The cell can comprise separate vessels in juxtaposition communicating with each other by a salt bridge or common arm which contains the porous membrane. If desired, the chambers can be provided within a single vessel by dividing the vessel with a wall, a portion or all of which comprises the aforementioned porous membrane. In a preferred design, the chambers are concentrically positioned cylinders having a steel outer vessel to be used as the cathode and an inner concentric cylinder composed of the porous membrane. Within the latter is disposed a carbon rod which, preferably is fluted to expose a maximum surface area which is used as the anode. An inlet for the olefin and anolyte and an outlet for removal of the anolyte and product are provided interiorly of the porous membrane, i.e., in the anode chamber, and a gas outlet is provided in the annular chamber between the porous membrane and the outer vessel, i.e., in the cathode chamber.

The electrolytic processing can conveniently be performed in the aforementioned or any conventional electrolytic cell by using an anolyte that comprises, preferably, an anhydrous reaction medium containing any of the aforementioned alcohols alone or in admixture with any of the aforementioned solvents. The anhydrous state can be assured by use of from 1 to 50, preferably 1 to 15 percent of any of the aforementioned dehydrating agents. The anolyte also contains a soluble salt of the aforementioned platinum metals, and, preferably, a soluble salt of one of the aforementioned multivalent metals, these salts being used in the previously set forth concentrations.

During the reaction, the olefin, an alcohol and carbon monoxide are charged, preferably continuously, to the anode chamber. There occurs during the reaction a net formation of hydrogen cations as well as desired unsaturated ester product in the anode chamber, released from the alcoholic reactant in the ester formation. In a preferred process, the anolyte also contains the aforementioned quantities of a halide anion. When the product is recovered, e.g., either by vaporization or stripping from the anode chamber or by withdrawal of a portion of the liquid anolyte and subsequent distillation, the volatile hydrogen halide is also removed from the liquid anolyte. In this fashion, the pH of the anolyte can be readily maintained constant at the desired initial value despite the net formation of hydrogen cations in the reaction. To furnish the halide anion to the anolyte, the cathode chamber can contain an alcoholic or other organic solvent solution of hydrogen halide. Hydrogen will be produced by the reduction in the cathode and the halide anions will pass through the diaphragm cell divider as the current conducting species, thereby maintaining a constant halide concentration in the anolyte. The hydrogen halide volatilized during product recovery can of course be introduced into the cathode chamber. In this fashion, an electrolytic process is devised for the continuous production of an unsaturated ester from an olefin, carbon monoxide and an alcohol.

The following examples will illustrate a mode of practice of my invention and demonstrate the results obtainable therefrom:

Example 1

Into a 300 milliliter pressure vessel were placed one part palladium chloride, 20 parts anhydrous cupric chloride and 300 milliliters methanol. The vessel was pressured with ethylene to 600 p.s.i.g. and carbon monoxide was added to increase the pressure to 1200 p.s.i.g. The bomb was rocked while heating to 120° C. and held at that temperature for four hours. At the end of the four-hour period the final pressure was 600 p.s.i.g., indicating absorption or reaction of the gaseous reactants. The bomb was then cooled, depressured and opened and the liquid contents filtered to separate insoluble cuprous chloride. The filtrate was distilled to obtain a product having a boiling point of about 61° C. corresponding to the boiling point of the methanol-methyl acrylate azeotrope. The distillate was identified to be the azeotrope by gas chromatography and gave a positive bromine test. The material readily polymerized to a viscous liquid upon standing.

Example 2

The pressure vessel was charged with 1 gram palladium chloride, 20 grams anhydrous cupric chloride and 100 milliliters of n-butanol. Ethylene was introduced until the pressure was 500 p.s.i.g., then carbon monoxide until the pressure was 1000 p.s.i.g. The vessel was rocked and heated to 120° C. and held at that temperature for 4 hours when the pressure had declined to 300 p.s.i.g. The vessel was cooled, depressed and opened and its contents filtered. The filtrate was distilled to recover 13 grams n-butyl acrylate and 3 grams n-butyl beta-n-butoxypropionate.

When the experiment was repeated with cupric chloride dihydrate in lieu of the anhydrous salt, a slower oxidation occurred to yield 3 grams n-butyl acrylate.

Example 3

Into a half-gallon autoclave was introduced 1 gram palladium chloride, 74 grams cupric chloride and 500 milliliters methanol. The autoclave was pressured to 400 p.s.i.g. with ethylene and then to 1000 p.s.i.g. with carbon monoxide. The mixture was heated to 100° C. and held at that temperature for 3 hours while stirring. After 3 hours, the autoclave was cooled, depressured and opened and the liquid contents were distilled to recover 5 grams methyl acrylate and 15 grams acetone.

The preceding examples are set forth solely to illustrate a mode of practice of my invention and to demonstrate the results obtainable thereby. The examples are not intended to be unduly limiting of my invention which is intended to be defined by the steps and reagents, or their apparent equivalents, set forth in the following claims.

I claim:

1. The oxidative carbonylation of a hydrocarbon olefin having from 2 to about 20 carbons to an ester of a carboxylic acid having one more carbon in the acid portion thereof than said olefin and selected from the class consisting of unsaturated carboxylic and beta-alkoxy substituted carboxylic acids which comprises contacting said olefin and carbon monoxide with a monohydroxy alcohol having 1 to about 20 carbons, in the presence of a catalytic amount of a salt or a chelate selected from the class consisting of acetyl acetonate, citric acid and ethylene diamine tetraacetic acid chelates of a platinum group metal in an elevated oxidation state and a salt of a multivalent metal having an oxidation potential more positive than said platinum metal, under substantially anhydrous conditions, at a temperature from about 25° to about 300° C. and a pressure from atmospheric to about 2500 p.s.i.g. to reduce said multivalent metal to a lower oxidation state and thereby form said ester.

2. The oxidative carbonylation of claim 1 wherein said contacting is effected at a pressure from 100 to about 2500 p.s.i.g. with a substantially anhydrous reaction medium containing said alcohol and soluble salts of said platinum group metal and said multivalent metal.

3. The oxidative carbonylation of claim 1 wherein said ester is an alkyl ester of an unsaturated carboxylic acid having one more carbon than said olefin.

4. The oxidative carbonylation of claim 7 wherein said alcohol is n-butanol.

5. The oxidative carbonylation of claim 1 performed continuously wherein a halogen is contacted with said salt of a multivalent metal to oxidize said multivalent metal from said lower oxidation state to an elevated oxidation state whereby said multivalent metal is restored to an oxidation potential more positive than said platinum metal.

6. The carbonylation of claim 1 wherein said platinum metal is palladium and said multivalent metal is copper.

7. The carbonylation of claim 1 wherein said olefin is ethylene, said alcohol is an aliphatic alcohol having 1 to about 6 carbons and said ester is an alkyl acrylate.

8. The carbonylation of claim 5 wherein said platinum metal is palladium and said multivalent metal is copper.

9. The carbonylation of claim 5 wherein said olefin is ethylene, said alcohol is an aliphatic alcohol having 1 to about 6 carbons and said ester is an alkyl acrylate.

References Cited

UNITED STATES PATENTS

| | | | |
|---|---|---|---|
| 2,831,029 | 4/1958 | Vergilio et al. | 204—59 |
| 2,876,254 | 3/1959 | Jenner et al. | 260—486 |
| 3,040,090 | 6/1962 | Alderson et al. | 260—486 XR |
| 3,065,242 | 2/1962 | Alderson | 260—486 |
| 3,309,403 | 3/1967 | Mador et al. | 260—544 |
| 3,338,961 | 8/1967 | Closson et al. | 260—486 XR |
| 3,221,045 | 11/1965 | McKeon et al. | 260—497 |

OTHER REFERENCES

Tsuji et al.: Part 1, Tetrahedron Letters, No. 16, pp. 1061–1064 (1963).

Tsuji et al.: Part II, Tetrahedron Letters, No. 22, pp. 1437–1440 (1963).

LORRAINE A. WEINBERGER, *Primary Examiner.*

A. P. HALLUIN, *Assistant Examiner.*